US007690406B2

(12) United States Patent
Giesen

(10) Patent No.: US 7,690,406 B2
(45) Date of Patent: Apr. 6, 2010

(54) HAZARDOUS WASTE TRANSFER PORT SYSTEM AND STORAGE CONTAINER

(75) Inventor: Isaac M. Giesen, Red Wing, MN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 808 days.

(21) Appl. No.: 11/542,409

(22) Filed: Oct. 3, 2006

(65) Prior Publication Data

US 2007/0074784 A1 Apr. 5, 2007

Related U.S. Application Data

(60) Provisional application No. 60/723,690, filed on Oct. 5, 2005.

(51) Int. Cl.
*B65B 3/26* (2006.01)
*B65D 41/06* (2006.01)
*B09B 1/00* (2006.01)

(52) U.S. Cl. ........................ 141/275; 141/332; 141/346; 141/369; 141/384; 220/290; 220/293; 588/249

(58) Field of Classification Search ................. 141/250, 141/275, 332, 340, 343, 346, 347, 369, 370, 141/384; 220/211, 288, 290, 293, 304, 810, 220/813, 835; 53/331.5; 588/1, 15, 249, 588/900

See application file for complete search history.

(56) References Cited

U.S. PATENT DOCUMENTS

| 4,141,609 | A |   | 2/1979  | Eisert          |         |
|-----------|---|---|---------|-----------------|---------|
| 4,297,827 | A | * | 11/1981 | Allison         | 53/282  |
| 4,945,955 | A |   | 8/1990  | Murphy          |         |
| 5,263,521 | A |   | 11/1993 | Brossard et al. |         |
| 5,460,439 | A |   | 10/1995 | Jennrich et al. |         |
| 5,523,519 | A |   | 6/1996  | Weber et al.    |         |
| 5,588,473 | A | * | 12/1996 | Glachet         | 141/387 |
| 5,595,711 | A |   | 1/1997  | Wilson et al.   |         |
| 5,715,646 | A | * | 2/1998  | Smekens         | 53/121  |

OTHER PUBLICATIONS

International Search Report from International application No. PCT/US06/38667.

* cited by examiner

*Primary Examiner*—Timothy L Maust
(74) *Attorney, Agent, or Firm*—Pauly, DeVries Smith & Deffner, LLC

(57) ABSTRACT

A hazardous material transfer system for the transfer of waste from a containment cell through a transfer port to a storage vessel. A port door in the containment cell is movable between a open and closed positions relative to the transfer port. The port door has a closure face with a first connector set. A storage vessel sealed by a storage vessel cover is provided for receipt of waste transferred through the port. The cover has an outside face that carries a second connector set that interlocks with the first connector set on the port door. The inside face of the vessel cover has a third connector set. A fourth connector set is located on the storage vessel and mates with the third connector set to lock and seal the cover to the vessel. The connector sets are the variety that engage and disengage upon rotational motion.

29 Claims, 17 Drawing Sheets

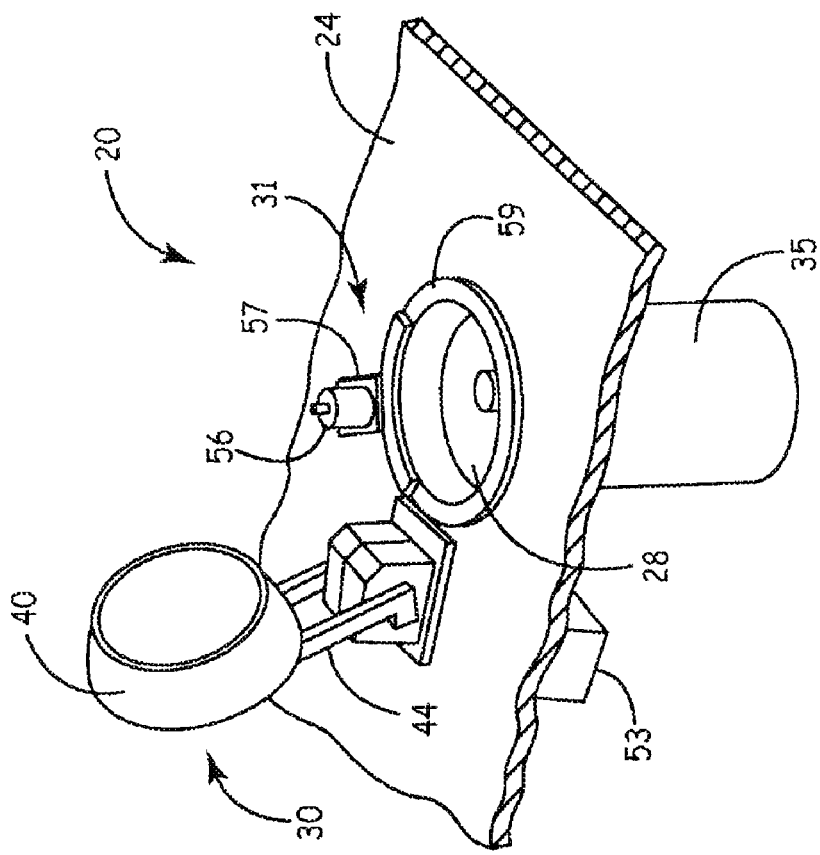
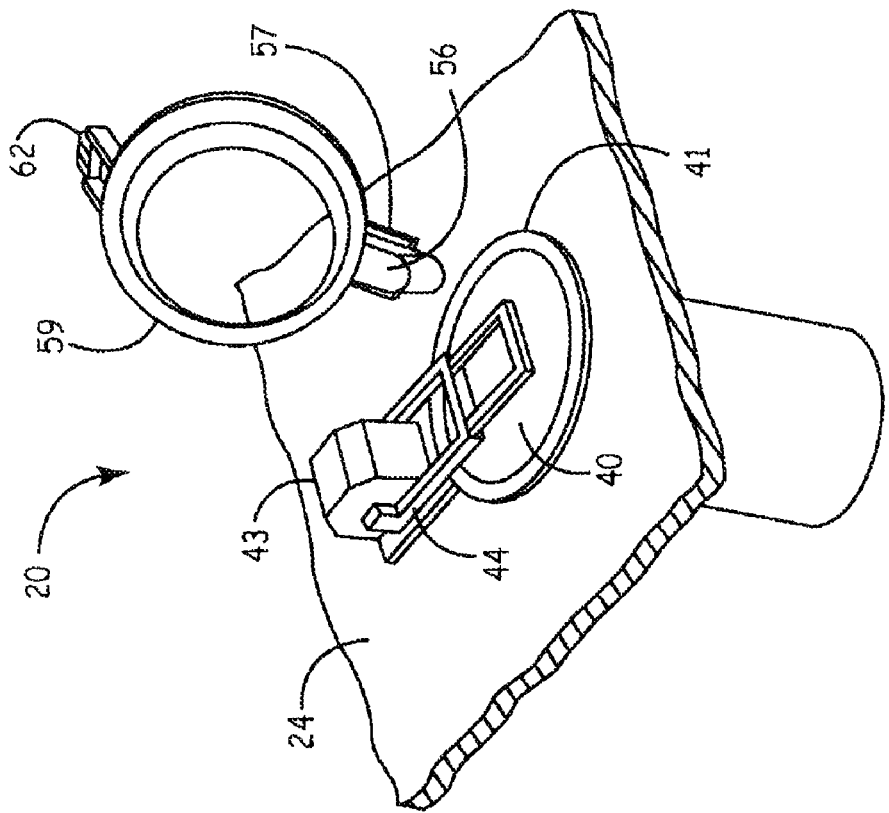

HAZARDOUS WASTE TRANSFER PORT SYSTEM AND STORAGE CONTAINER

CROSS REFERENCE TO RELATED APPLICATION

This application claims the benefit of U.S. Provisional Patent Application Ser. No. 60/723,690 filed Oct. 5, 2005.

BACKGROUND OF THE INVENTION

The invention pertains to a system for the secure transfer of material and in particular of hazardous material from an isolated environment to a storage container external to that environment. Such material can be a hazardous radioactive or toxic material that needs to be transferred from a containment enclosure such as a closed storage basin or room to a portable storage vessel. A containment cell will typically have a wall or floor with a transfer port for removal of the objectionable material to the portable vessel. It is important that the transfer equipment enable secure transfer of the material so as to avoid contamination of the surrounding environment. This gives rise to a requirement for a system for the secure transfer of the material from the containment area to the storage vessel.

SUMMARY OF THE INVENTION

The invention pertains to a hazardous material transfer system for the transfer of waste from a containment cell to a storage vessel. The containment cell has a floor with a waste transfer port. A port door is installed interior to the containment cell. The port door is movable between a closed position closing and sealing the transfer port, and an open position clear of the port. The port door has a closure face with a first connector set.

A waste storage container includes a storage vessel for receipt of waste transferred through the port. The storage vessel is closed and sealed by a storage vessel cover. The cover has an outside face that carries a second connector set that interlocks with the first connector set on the port door. The first and second connector sets are the variety that engage and disengage upon rotation of the cover relative to the closure face of the port door. This includes, for example, a bayonet connection or a screw connection.

The inside face of the vessel cover has a third connector set. A fourth connector set is located on the storage vessel sidewall and mates with the third connector set to lock and seal the cover to the vessel. The third and fourth connector sets are also the variety that engage and disengage upon rotational motion of the cover relative to the storage vessel.

A docking station is provided to dock the storage vessel to the transfer port for the waste transfer procedure. The docking station includes a docking ring assembly with an inside locking ring and a concentric symmetrical outside docking ring. Each ring is a cylindrical segment with an inverted crown shape. Each ring includes a band with crown peaks extended downwardly from the band and defining crown valleys or slots between the peaks. The inside ring is stationary. The outside ring is rotatable relative to the inside ring between aligned and unaligned positions. A motor can be provided for rotation of the outside ring.

The storage vessel has a rigid neck that includes a docking collar that has a plurality of radially extending alignment lugs spaced about the periphery of the neck. The alignment lugs are spaced to correspond to the peaks and valleys on the docking ring assembly.

According to the use of the system, the closed storage vessel is moved to a position beneath the docking station in line with the transfer port preparatory to a transfer procedure. The vessel is elevated to the transfer port. As the vessel approaches the docking station, the docking lugs are intercepted by the crowns on the aligned docking rings. The crown surfaces guide the docking lugs to the slots between the crown peaks. When the docking lugs are seated in the slots the port door and the vessel cover are poised to interlock and the vessel is sealed against a cell flange. The outer docking ring is rotated to rotate the vessel. This rotation interlocks the port door and the vessel cover. The same rotation is effective to disengage the third and forth connector sets to unlock the vessel cover from the vessel. The vessel cover can be moved away from the vessel for the transfer of material.

With the vessel cover attached to it the port door is opened to uncover the vessel. The open vessel is loaded with waste material from the containment cell. This is typically accomplished with remote manipulators. A funnel is available for positioning in the port to facilitate transfer of material and protect the surrounding structure from impact by material being loaded into the vessel.

The procedure is reversed upon completion of material transfer. The vessel cover is positioned on the vessel by closing the port door. The vessel is rotated by docking rings acting on docking lugs on the vessel. The rotational movement disengages the vessel cover from the port door and at the same time locks the vessel cover to the vessel.

BRIEF DESCRIPTION OF THE DRAWINGS

FIG. 2 is a perspective view of a portion of the waste transfer system of FIG. 1 taken from an elevated vantage point;

FIG. 3 is a perspective view like that of FIG. 2 but showing the port door open preparatory to a waste transfer procedure;

DESCRIPTION OF A PREFERRED EMBODIMENT

Figure 1:
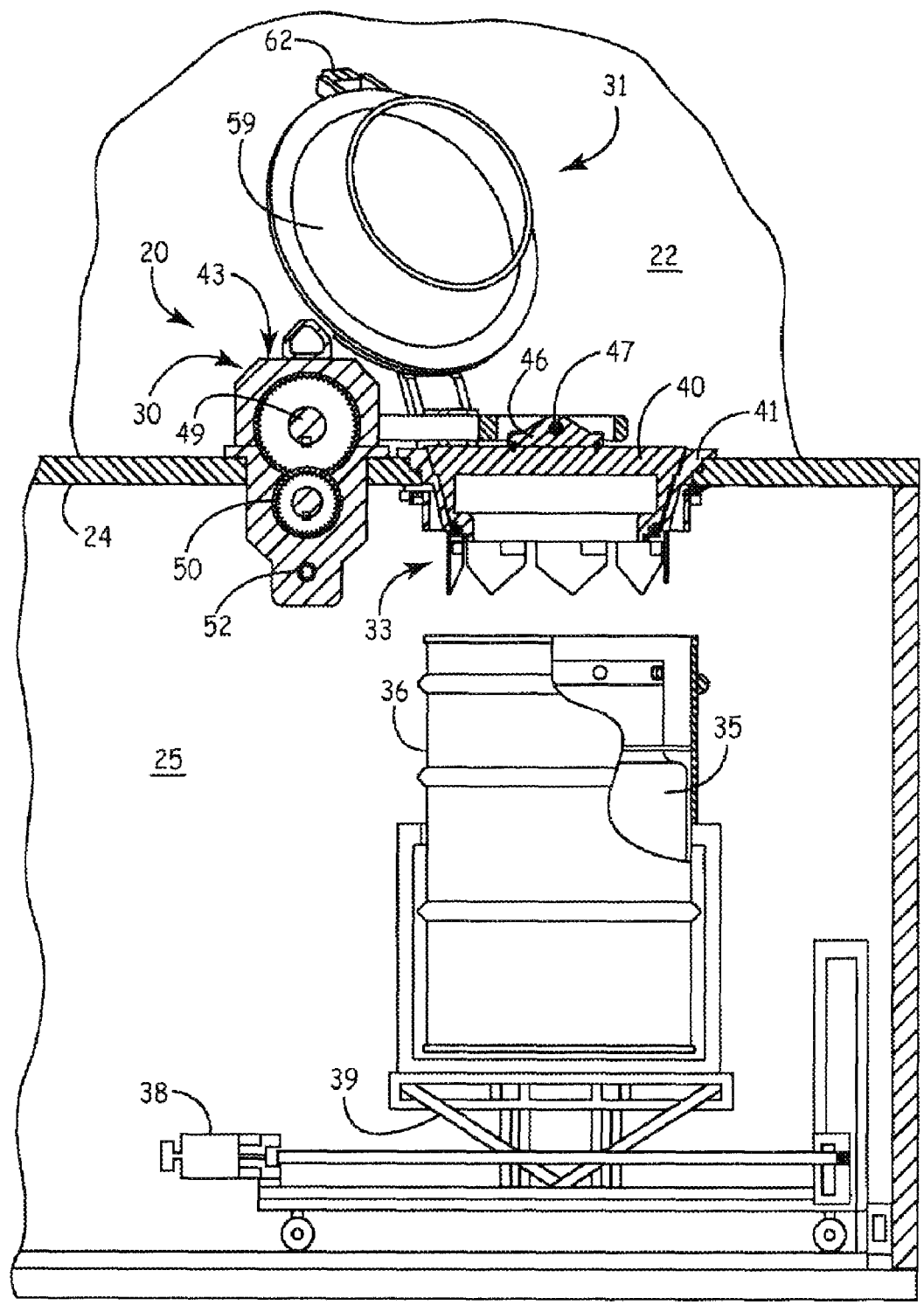
FIG. 1 is a side elevational view partly in section showing a waste transfer system installed relative to a collection room located beneath the floor of a containment cell, with the port door closed and a storage vessel poised to be moved into docking position.

Referring to FIGS. 1 through 3, a waste transfer system is indicated generally at 20. Waste transfer system 20 is for the transfer of hazardous waste from a containment cell 22 into a waste storage container. The waste storage container can include a storage vessel 35 which can be a drum liner that fits in a standard 55-gallon drum. Containment cell 22 has a cell floor 24 that separates it from a waste collection room 25 which will generally have a cleaner environment. Containment cell 22 contains waste material, for example, radioactive material that should not be exposed to the outside environment.

Floor 24 has a circular waste transfer port 28. A port door assembly 30 is installed on the containment side of cell floor 24. Port door assembly includes a port door 40 to close the port 28. A funnel assembly 31 is provided for installation in the port 28 when the port door is clear of the port. A docking station 33 is installed on the collection room side of floor 24 for docking the storage vessel 35 in sealed engagement with respect to the cell 22 during a waste material transfer procedure.

The door assembly 30 includes the port door 40 movable into and out of closing and sealed engagement with the port 28. A flanged ring or cell flange 41 is installed in the port 28 and defines a passage between the containment cell 22 and the collection room 25. The door 40 closely fits the interior perimeter of the passage of cell flange 41.

A pivot block 46 is attached to the top of door 40. A pivot pin 47 connects the pivot block 46 to a hinge bar 44. The opposite end of the hinge bar 44 is connected to a gear box 43 by a driven shaft 49.

Gear box 43 extends through the floor 24. Gear box 43 contains a plurality of interconnected gears 50. A drive shaft 52 is installed in gear box 43 on the collection room side of the floor 24. An electric motor 53 drives the drive shaft 52. Operation of the electric motor 53 moves the door 40 between the open and closed positions.

The funnel assembly 31 is moveable into and out of position with respect to the port 28. When the door 40 is in the open and clear position of FIG. 3, the funnel assembly is installed in the port. The funnel assembly includes a pivot block 56 mounted to the floor 24. Pivot arms 57 are pivotally connected to the pivot block 56. A protective funnel 59 is connected to the other end of the pivot arms 57. A handle 62 is connected to the funnel. The funnel 59 is moved into and out of engagement with the port 28 by manipulation of the handle 62. The handle 62 is remotely manipulated. The purpose of the funnel 59 is to cover the sealing components of the door assembly and protect them from impact and debris during waste transfer.

Figure 4:
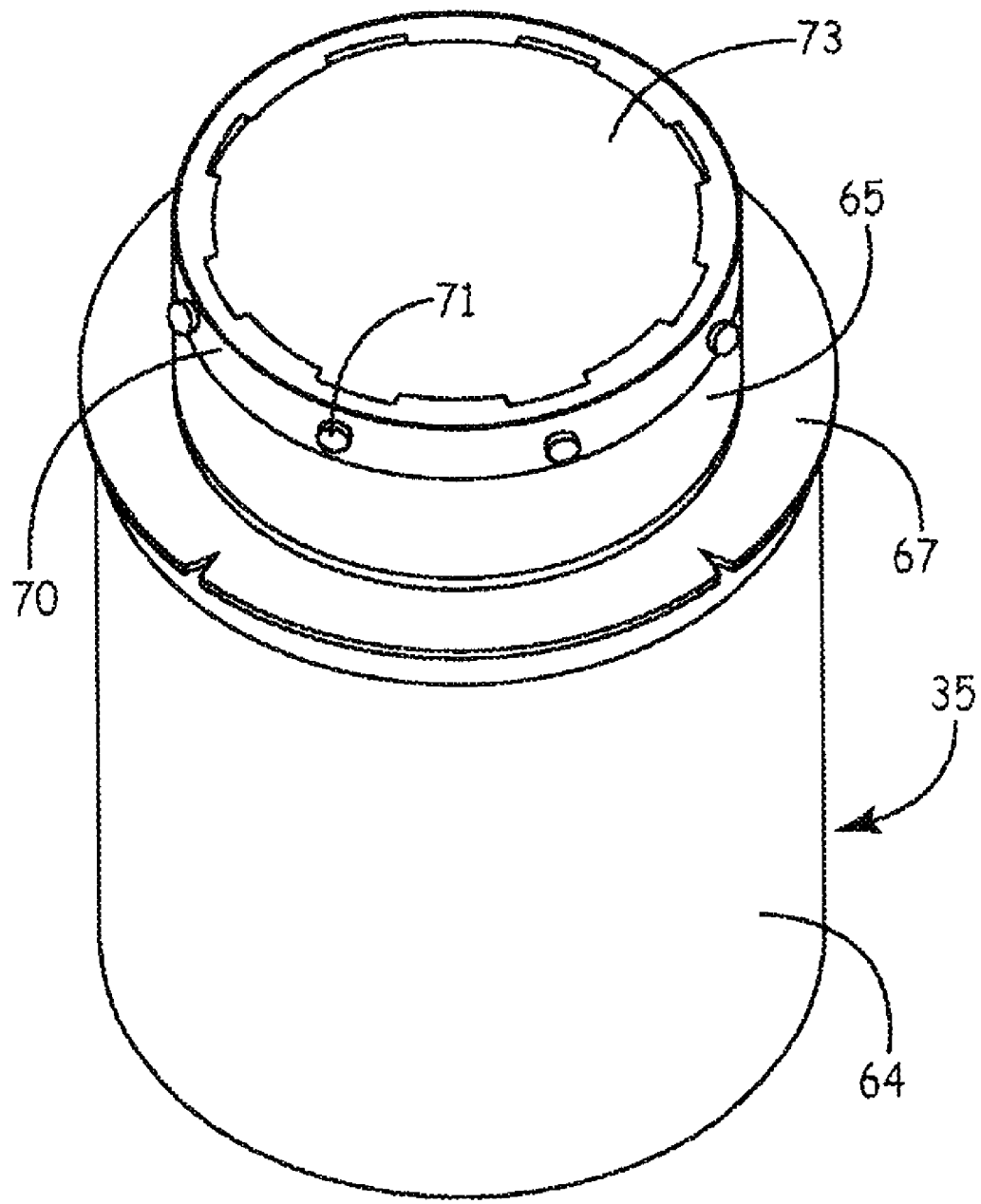
FIG. 4 is a side view of an embodiment of a storage vessel that can be used in conjunction with a 55-gallon drum.

Storage vessel 35 is housed in a standard 55-gallon drum 36 that is carried on a moveable trolley or bogie 38 with a scissors lift 39 for positioning beneath the port 28. FIG. 4 shows the storage vessel 35 apart from the 55-gallon drum 36. The vessel 35 has a cylindrical body 64 and a narrower neck 65. The vessel 35 is closed by a cover 73 that engages and disengages from neck 65 by rotational movement such as with a bayonet connection or a screw connection. Body 64 has a diameter to fit closely within the drum 36. A centering guide collar 67 is located on neck 65 and carries an outwardly directed flexible centering disk. The purpose of the centering disk is to aid in centering the vessel 35 inside a 55-gallon drum.

Figure 6:
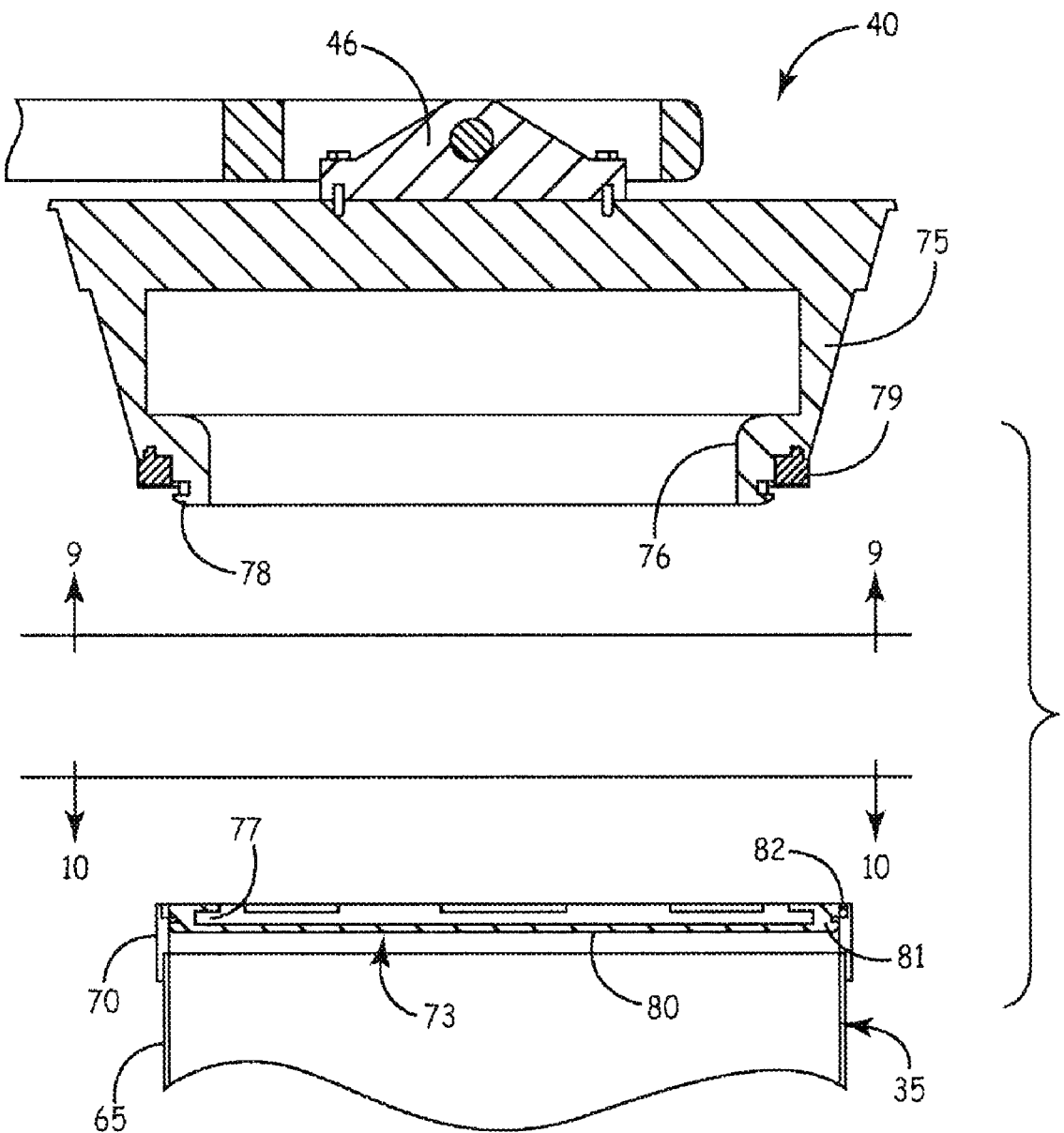
FIG. 6 is an enlarged sectional view of the port door in docking alignment with a storage vessel with the vessel cover attached to the storage vessel.
Figure 6A:
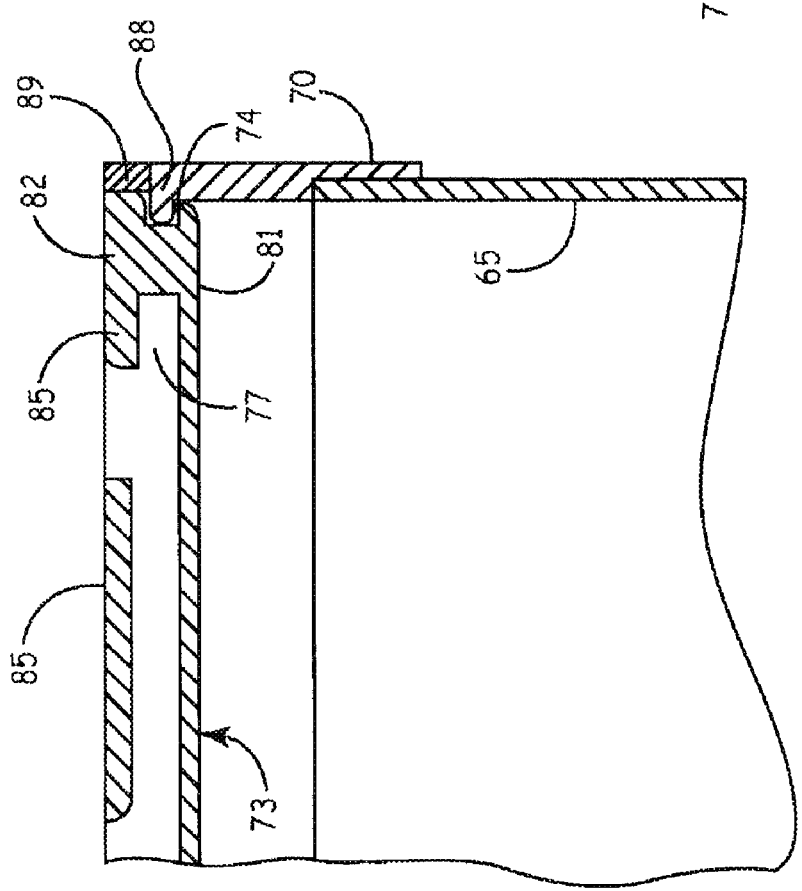
FIG. 6A is an enlarged view of a portion of the storage vessel and attached storage vessel cover of FIG. 6.

A collar 70 is attached to the end of the neck 65 (see FIG. 6A). Alignment lugs 71 radiate outward from the collar 70. The alignment lugs engage the docking station 33 as will be described.

Figure 5:
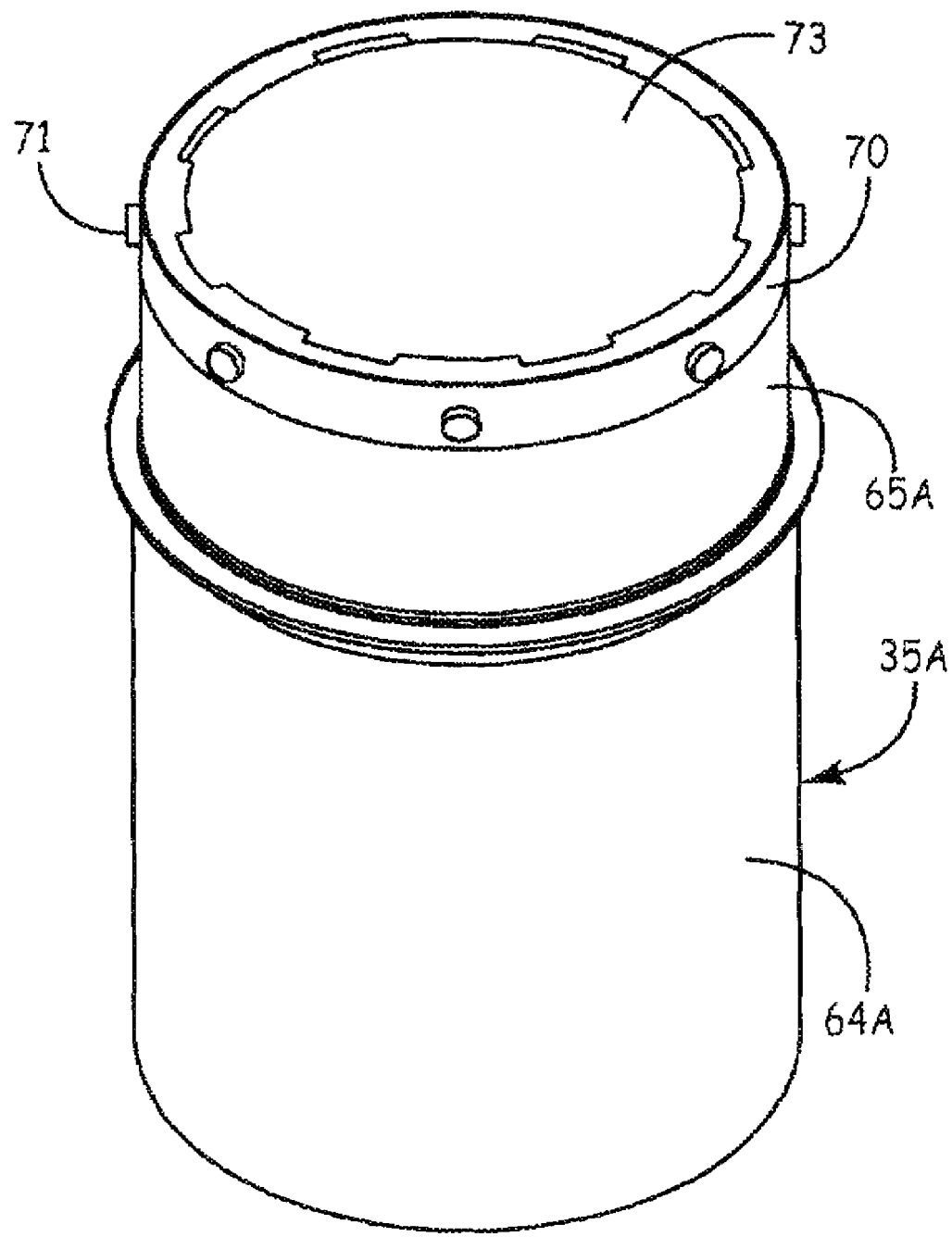
FIG. 5 is a side view of a another embodiment of a storage vessel that can be used in conjunction with a lined 55-gallon drum.

Vessel 35 of FIG. 4 installs in a standard unlined 55-gallon drum. Hazardous materials may require storage in a lined 55-gallon drum. FIG. 5 shows a storage vessel 35A for installation in a lined drum. The body portion 64A has a reduced diameter to accommodate the liner thickness of the lined 55-gallon drum.

Figure 9:
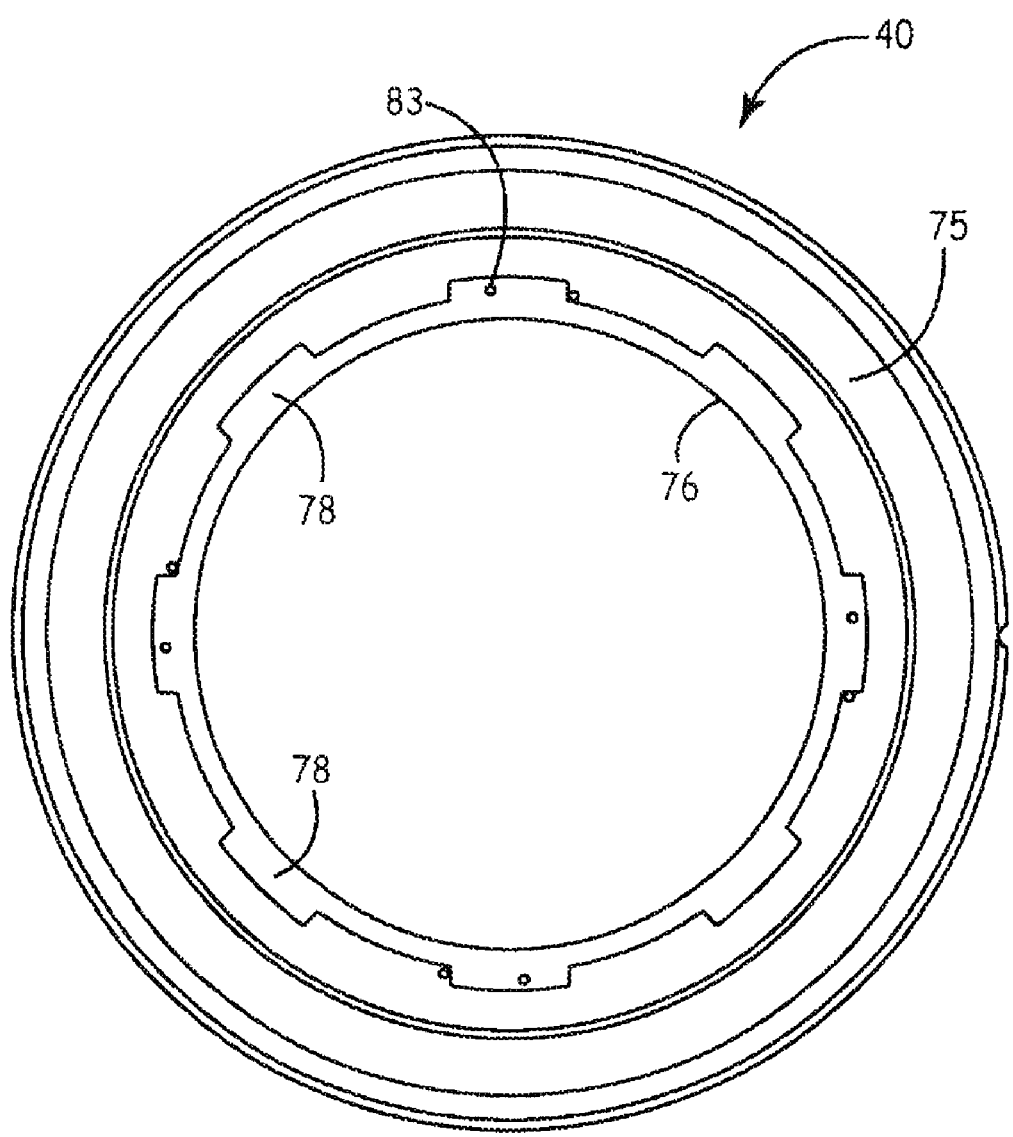
FIG. 9 is a view of the closure face of the port door of FIG. 6 taken along the line 9-9 thereof.

FIG. 6 shows the port door 40 aligned for docking to the cover 73 of closed storage vessel 35. Port door 40 has a truncated conical body 75 ending in a reduced diameter neck 76. The closure face of port door is shown in FIG. 9. A first connector set includes a perimeter of fastening ears 78 equally spaced about neck 76 and extending radially outward. Stop pins 83 extend inward from the ears 78 to the neck 76.

Figure 8A:
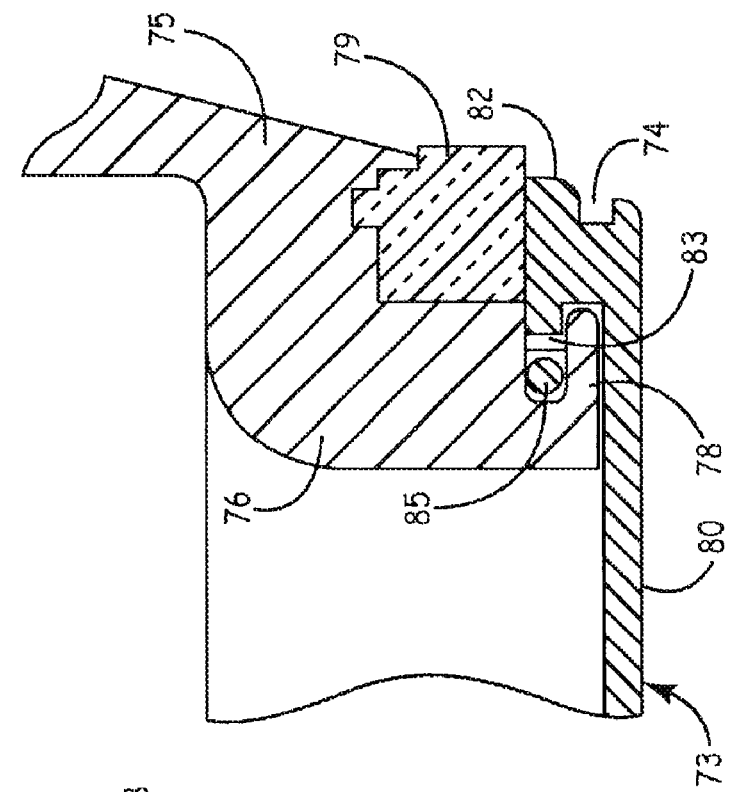
FIG. 8A is an enlarged view of a portion of the port door and attached storage vessel cover of FIG. 8.
Figure 10:
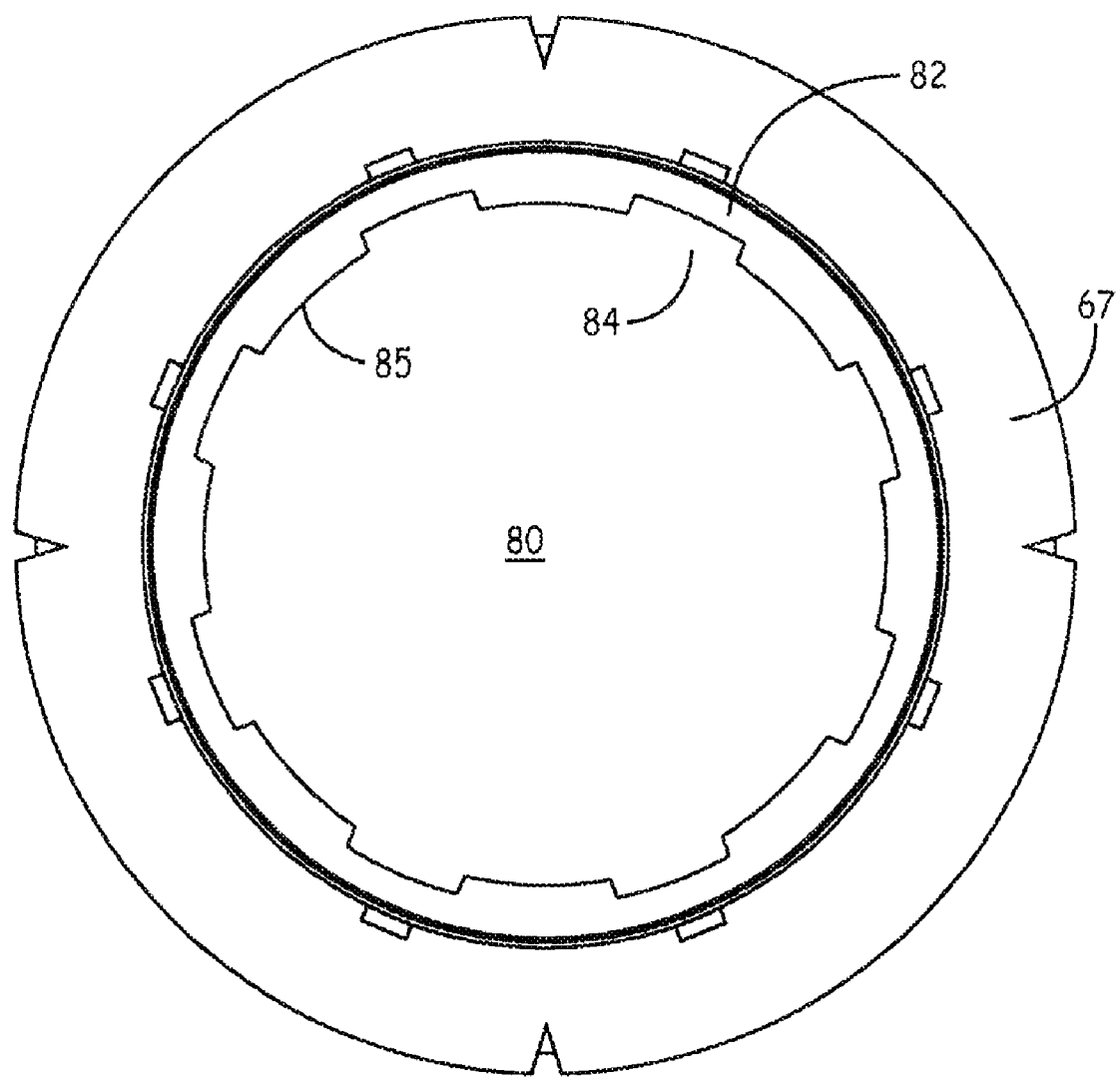
FIG. 10 is a view of the outside face of the storage vessel cover shown in FIG. 6 taken along the line 10-10 thereof.

The storage vessel 35 is shown in FIG. 6 with the cover 73 in place. The outer or exterior face of the cover is shown in FIG. 10. Cover 73 has a flat base 80 that carries a second and outwardly facing connector set. A circumferential rim 81 extends perpendicular from the base (see FIGS. 6A and 10). A lip 82 is attached to the end of the rim 81. Lip 82 is parallel to and spaced from the base 80 defining an interior channel 77 and an exterior channel 74 (FIG. 8A). The second connector set includes a perimeter of spaced apart notches 84 on lip 82 facing centrally inward to define a set of ears or tabs 85. The notches 84 are sized and spaced to correspond to the ears 78 on the closure face of the port door 40.

Figure 7:
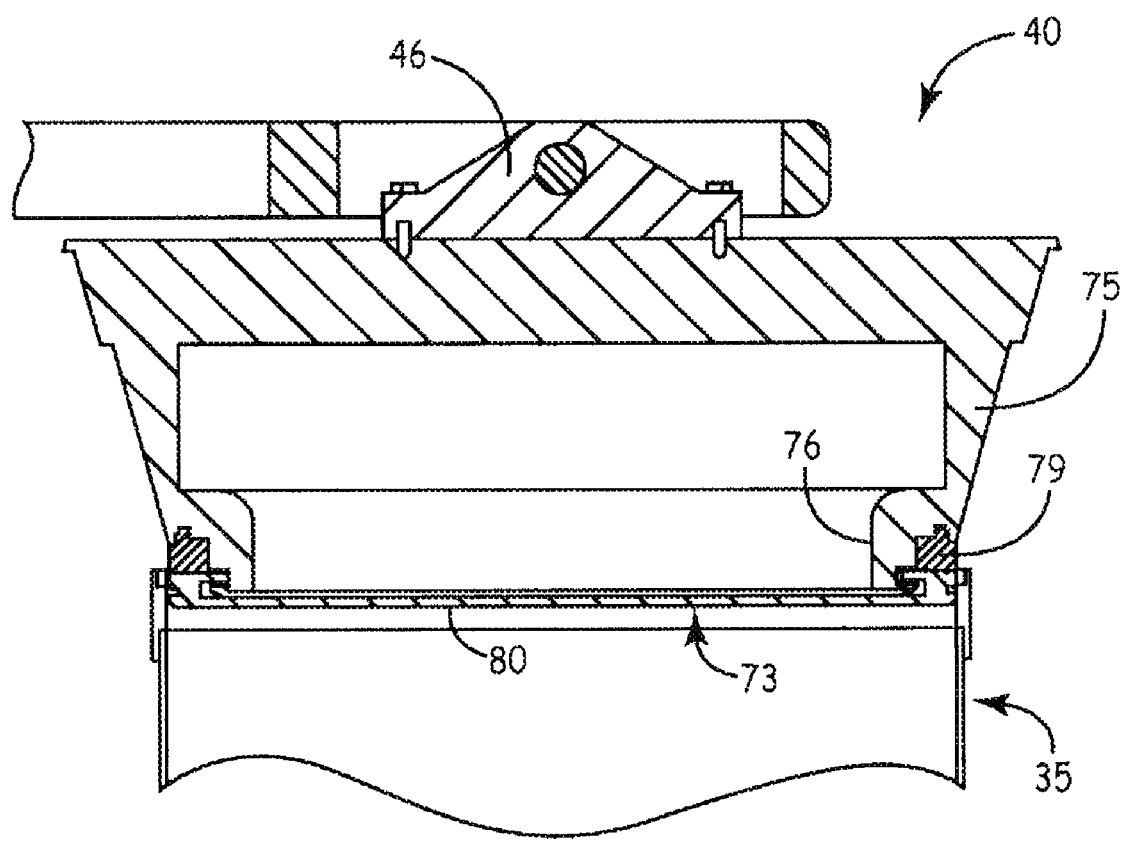
FIG. 7 is an enlarged sectional view of the port door engaged with the storage vessel cover with the cover attached to the storage vessel.

The closure face of port door 40 and the interior face of vessel cover 73 interlock for mutual sealing. Upon movement of port door 40 into position with respect to vessel cover 73 the ears 78 pass between the outside notches 84 to a location in the channel 77. This relationship is shown in FIG. 7 as well as FIG. 8A. Upon rotation of the vessel 35 the ears 78 move out of alignment with the notches 84 and into intercepting alignment with the lip 82. In this position the port door 40 is interlocked with the vessel cover 73. A seal 79 on port door 40 seals against the lip 82. Further rotation between the port door and the vessel cover is stopped by the stop pins 83. Such further rotation causes the vessel cover 73 to disengage from the vessel neck 65.

FIG. 8A shows a tab 85 of cover 73 located in the channel of door 40 defined by neck 76 and an ear 78. A portion of the tab 85 is shown broken away to show a stop pin 83.

Figure 8:
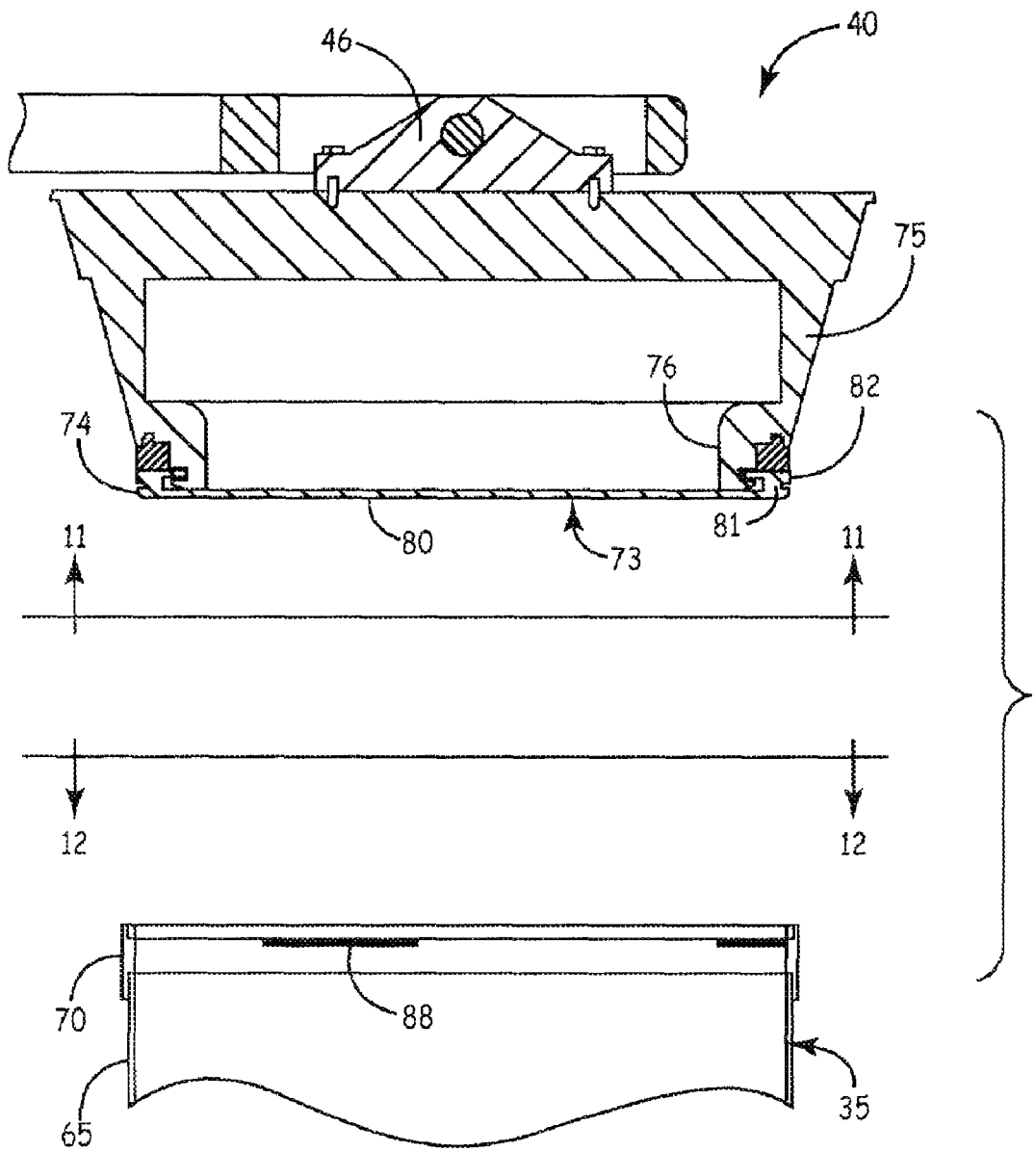
FIG. 8 is an enlarged sectional view of the port door locked to the storage vessel cover and moved away from the storage vessel.
Figure 11:
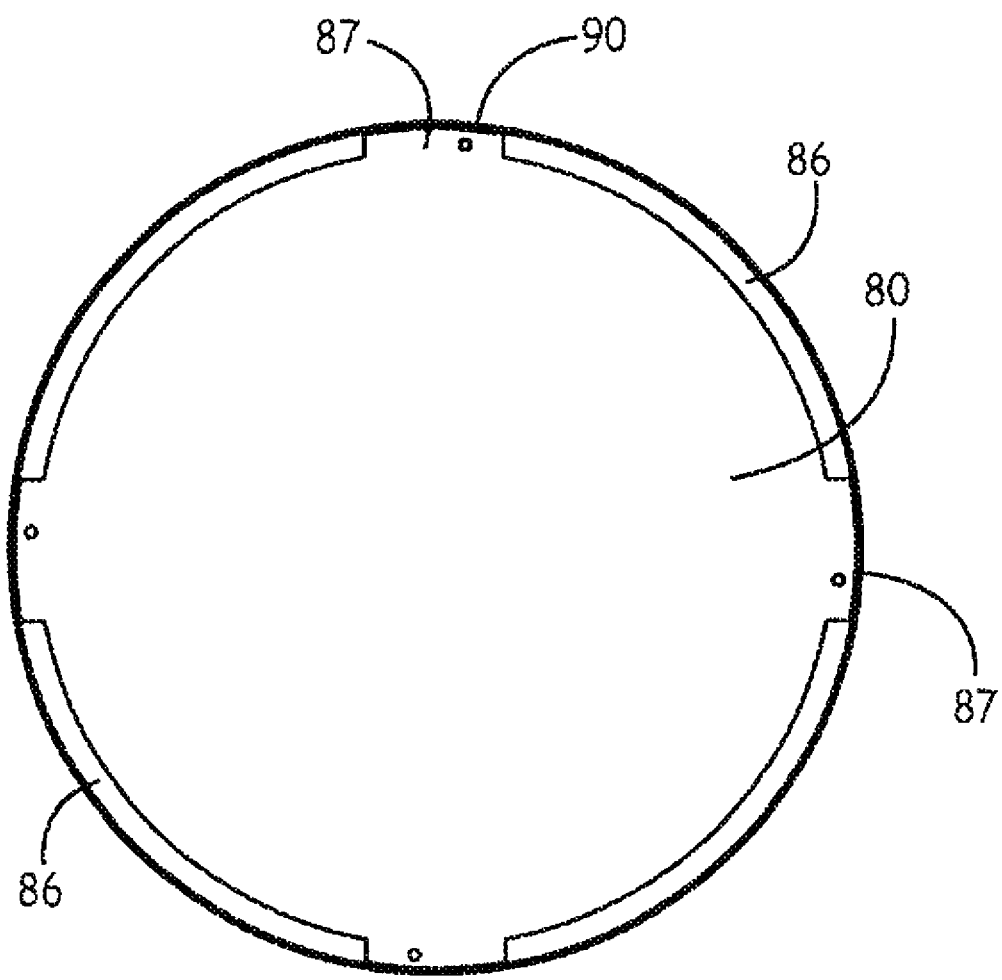
FIG. 11 is a view of the inside face of the storage vessel cover shown in FIG. 8 taken along the line 11-11 thereof.
Figure 12:
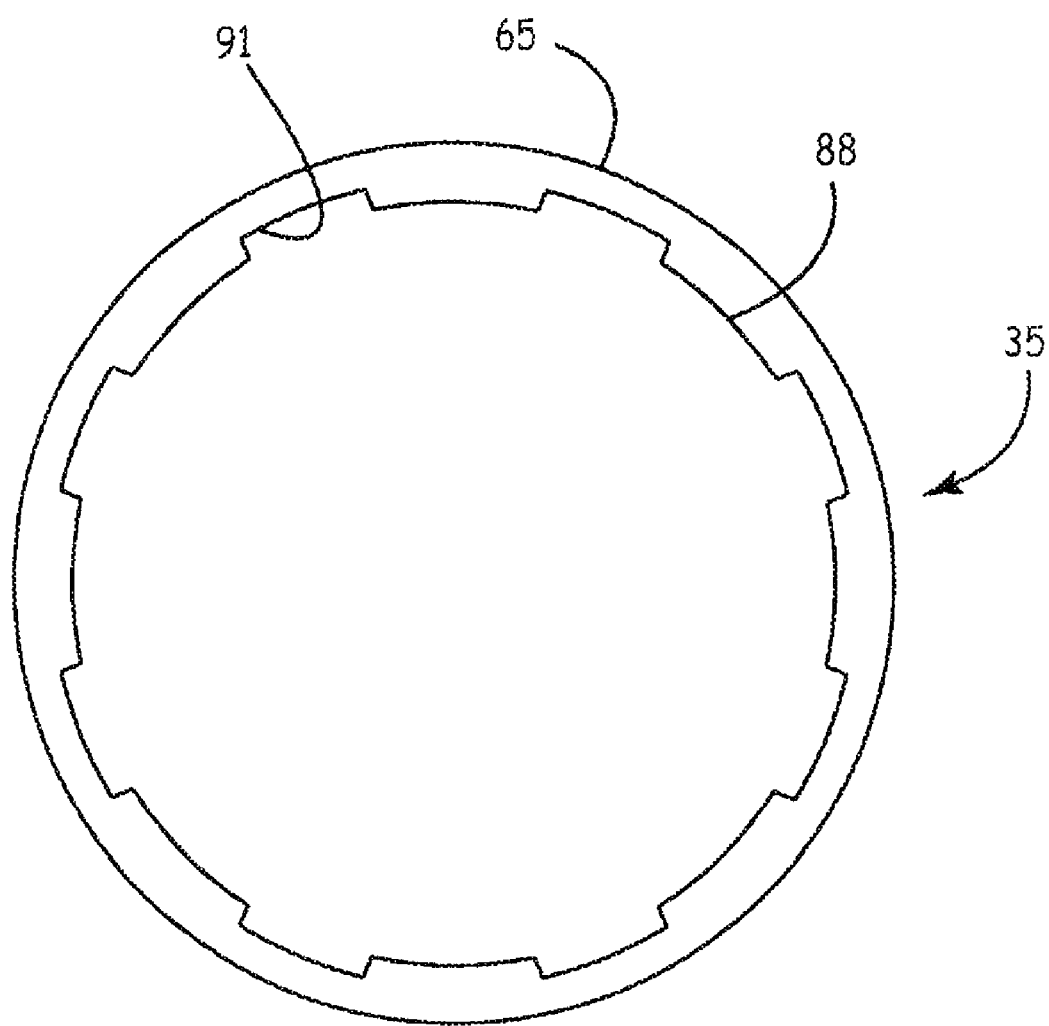
FIG. 12 is a view of the open end of the storage vessel of FIG. 8 taken along the line 12-12 thereof.

FIGS. 6 and 7 show the vessel cover 73 attached to vessel 35. FIG. 8 shows the vessel cover attached to the port door and disengaged and moved away from the vessel 35. FIG. 11 is a plan view of the inner face of the cover 73. FIG. 12 is a view that shows the open end of the vessel 35. A seal 89 on collar 70 attached to vessel neck 65 seals the vessel cover 73 when attached to the vessel as shown in FIG. 6.

The inner face of cover 73 has a third connector set for connection to a fourth connector set on the open end of vessel 35. As shown in FIG. 11 base 80 has a perimeter of notches 86 defining ears or tabs 87 which define the channel 74. As shown in FIG. 12 vessel 35 has a fourth connector set that includes a perimeter of spaced apart ears 88 extending inward from neck 65. Ears 88 are spaced apart by notches 91 in correspondence to the spacing of the notches 86 on the inner face of the cover 73. Cover 73 is assembled to the vessel 35 with the ears 88 of vessel 35 passing between the notches 86. Vessel 35 is rotated relative to the cover so that the ears move into the channel 74 (FIG. 6A). Stop members 90 limit the relative rotation between cover 73 and the open end of vessel 35.

The first and second connector sets and the third and fourth connector sets are relatively arranged and spaced such that rotation of the vessel 35 in one direction will interlock the port door to the outside face of the cover 73 and disengage the cover 73 from the vessel 35. Upon engagement of the first and second connector sets the vessel is rotated to the position where the port door ears 78 are restrained in channel 77. A stop member 83 in the channel is positioned to stop further relative rotation of the port door and the vessel cover. Further rotation of the vessel results in the vessel cover rotation relative to the vessel to a position of release from the vessel. The release position can be determined by an additional stop member in the channel. At the release position the port door and vessel cover can be moved away from the vessel as shown in FIG. 8.

A reverse procedure releases the port door from the vessel cover and engages the vessel cover with the vessel. In the procedure to close the vessel the port door with the vessel cover attached in brought into engagement with the vessel. Ears 87 on the inner face of the cover 73 pass through the notches 91 between tabs 88. The tabs 88 are engaged in the channel 74. Rotation of the vessel 35 moves the tabs 88 and ears 87 into blocking relationship to connect the cover 73 to the vessel 35. Further relative rotation of the cover and the vessel is stopped by one or more stop members 90. Further rotation of the vessel 35 disengages the vessel cover from the port door by disengaging the first and second connector sets.

Figure 13:
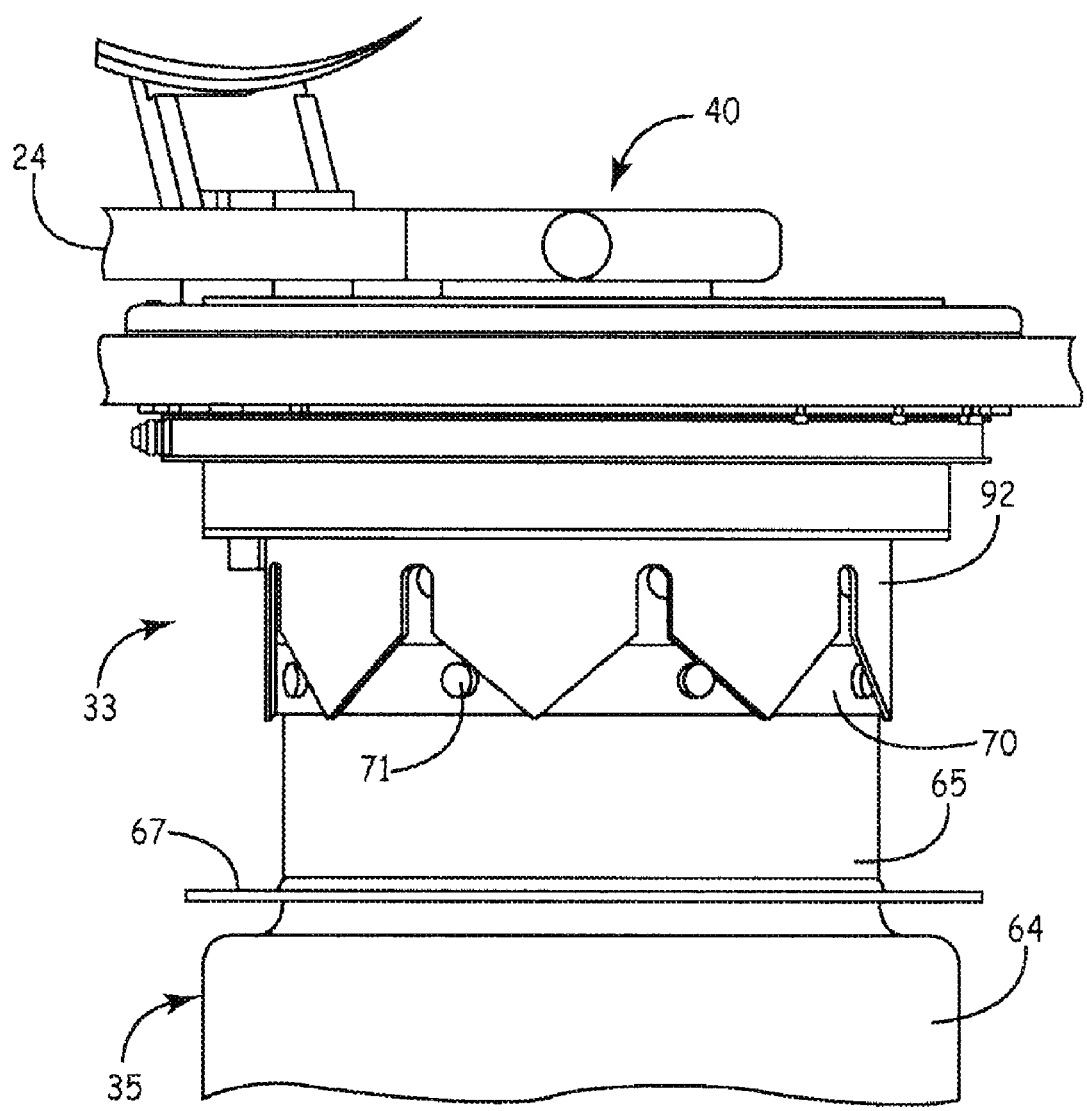
FIG. 13 is a side view of a portion of the waste transfer system showing the storage vessel moved toward a docking position.
Figure 14:
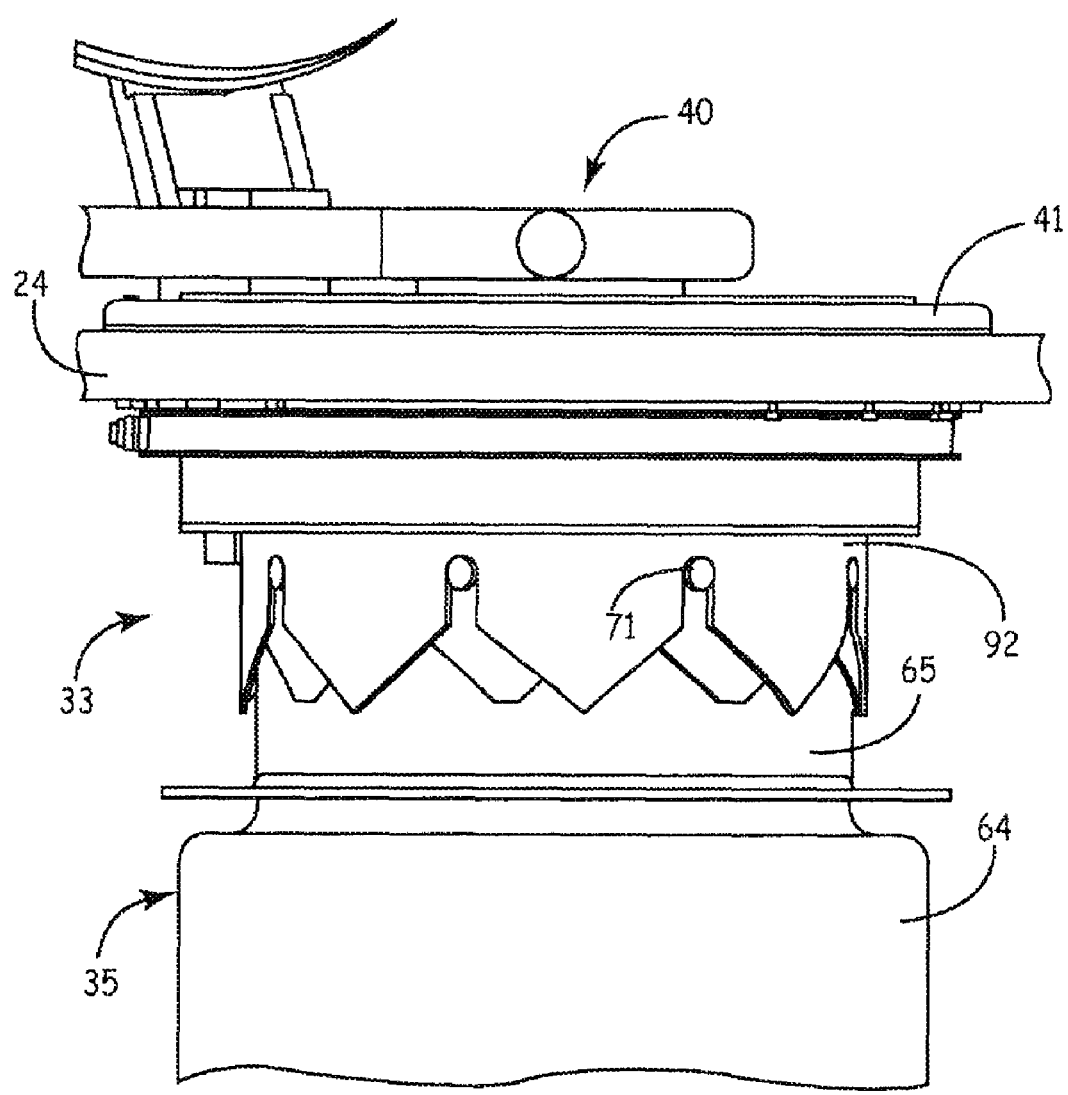
FIG. 14 is a side view like that of FIG. 13 showing the storage vessel docked.

FIG. 13 shows the vessel 35 in approach to dock to the docking station 33. FIG. 14 shows the vessel docked to the docking station 33. FIG. 13 shows the alignment lugs 71 on the alignment collar 70 of vessel 35 positioned to be guided by docking ring ramp surfaces. FIG. 14 shows the alignment lugs secured to docking station 33.

Figure 15:
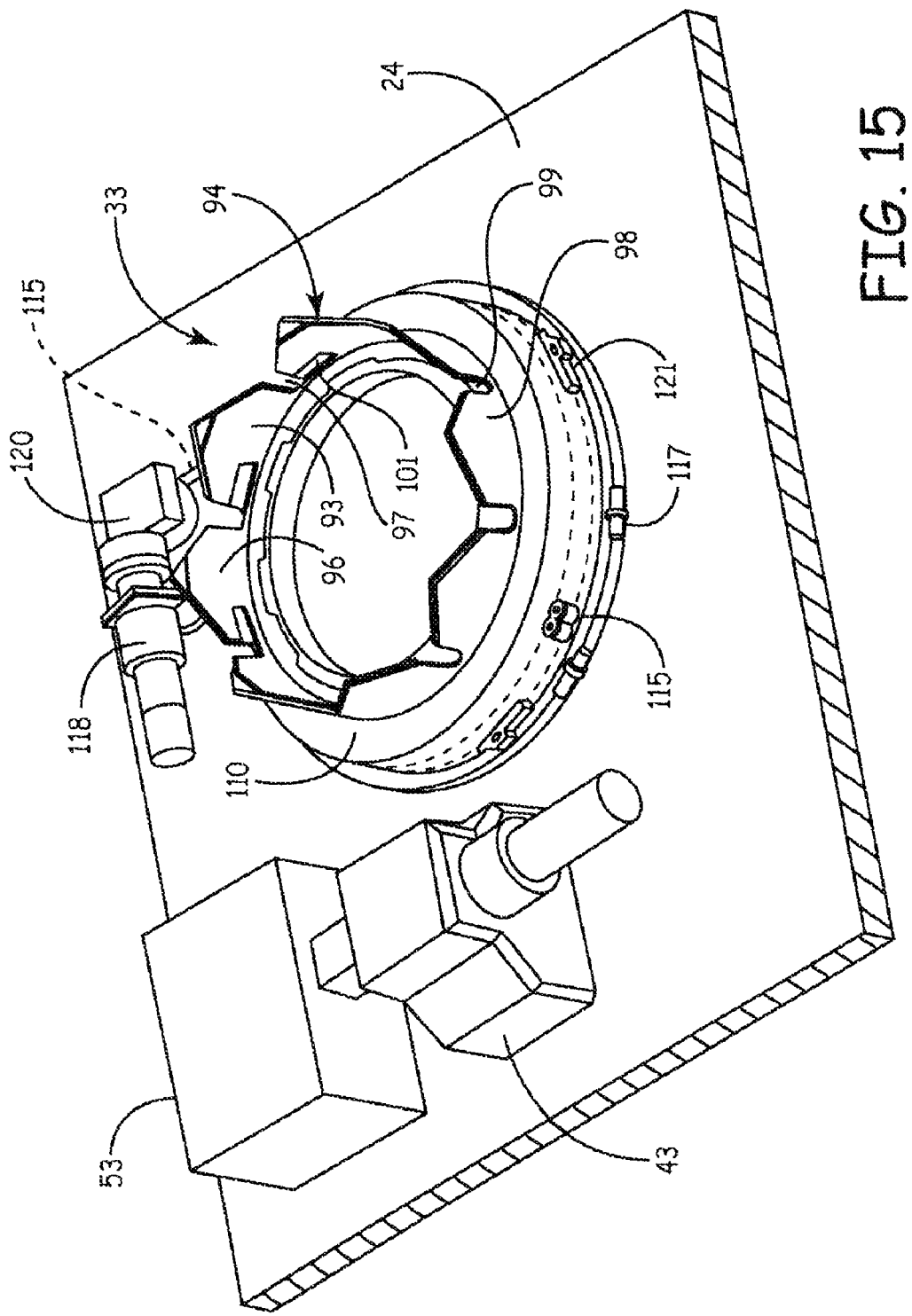
FIG. 15 is an underside view of the docking station.

FIG. 15 shows the docking station and a docking ring assembly 92 as viewed from underneath and apart from a storage vessel. The docking ring assembly 92 includes an inside locking ring 93 and a symmetrical outside docking ring 94. Each ring is a cylindrical segment with an inverted crown shape. The rings are concentric and assembled so that the outside ring 94 rotates relative to the inside ring 93. The rings have crown peaks separated by crown valleys or slots. Inside ring 93 has a circular array of crown peaks 96 spaced apart by vertical slots 97. The outside ring 94 has a corresponding symmetrical array of crown peaks 98 separated by vertical slots 99 that in the open position of the docking ring are aligned with the slots 97 of the inside ring. In addition each crown peak 96 of the inside ring 93 has a horizontal locking slot 101 that intersects the vertical slot 97.

Figure 16:
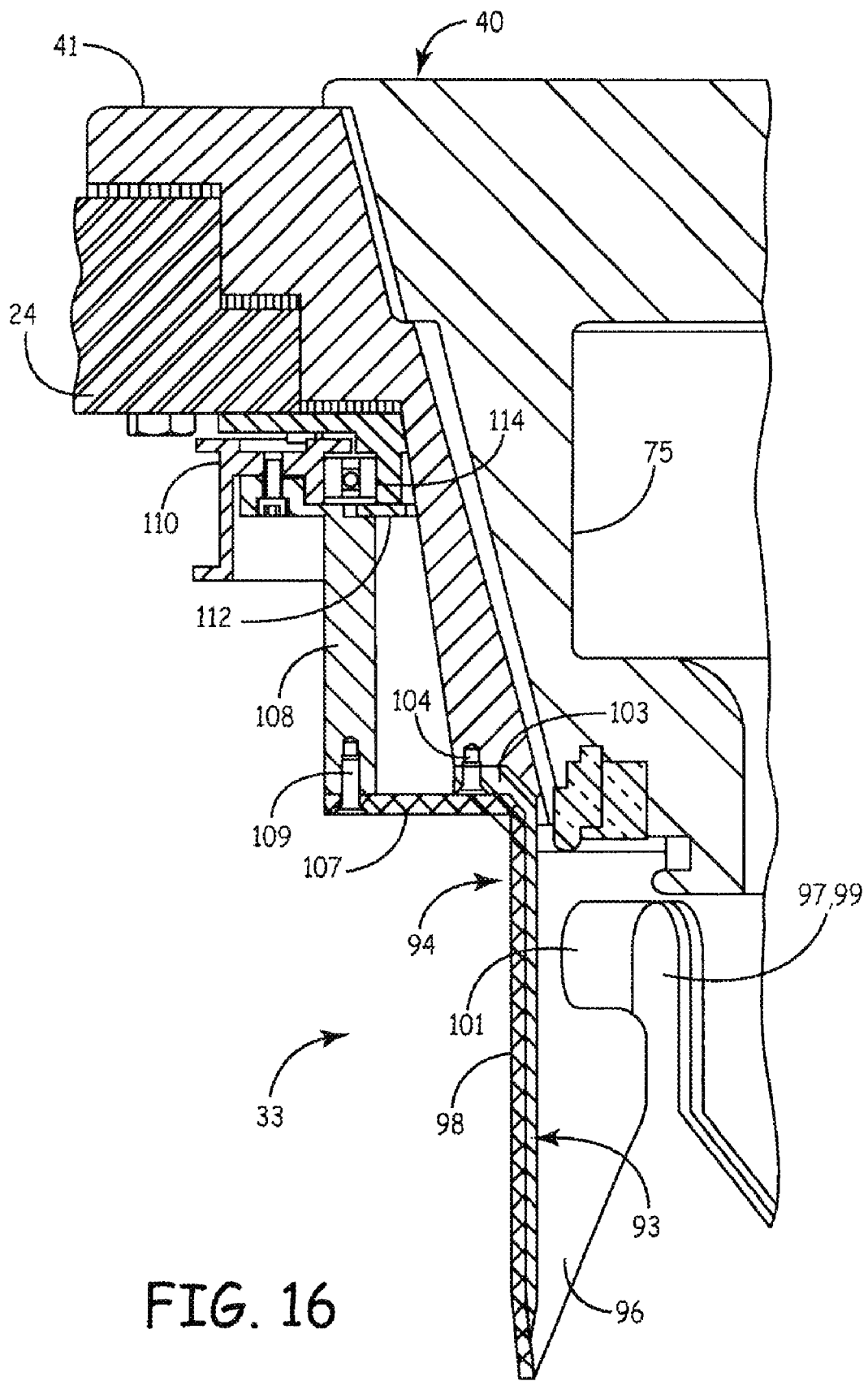
FIG. 16 is a sectional view showing the relationship between the cell flange, the port door and the docking station.
Figure 17:
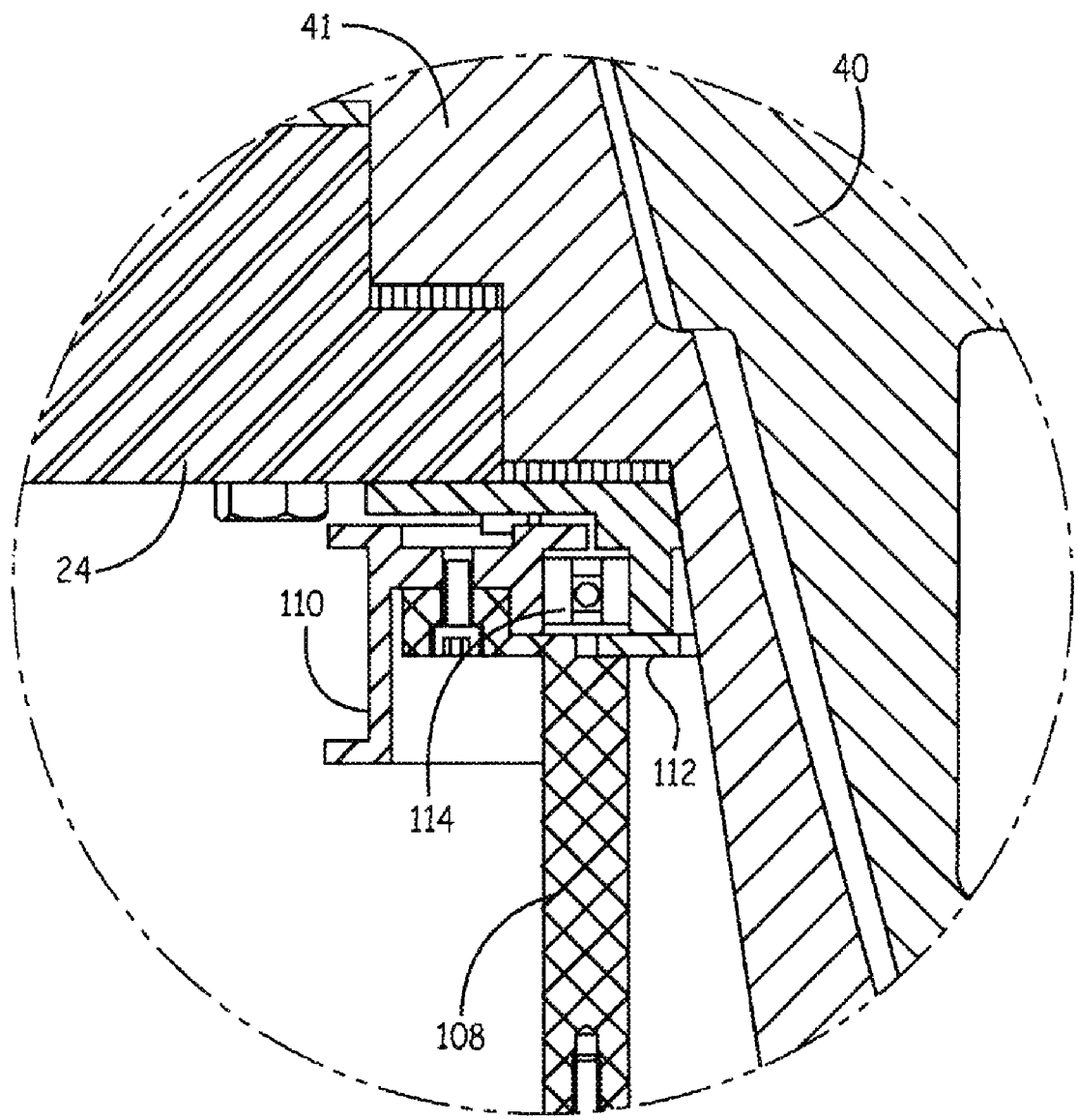
FIG. 17 is an enlarged sectional view of a portion of the cell flange, port door and docking station shown in FIG. 16.

The relationship between the inner and outer rings is shown in FIG. 16 and in enlarged detail in FIG. 17. Port door 40 is shown closing the transfer port. The inner ring 93 has a horizontal rim 103 that is fastened to the lower surface of the cell flange 41 by suitable fasteners 104. The inner ring 93 is held stationary in surrounding relationship to the closure face of the port door 40. The outer ring 94 surrounds the inner ring 93 and slides concentrically relative to it. The outer ring 94 has an upper horizontal rim 107. Rim 107 is fastened to a connector ring 108 by fasteners 109. Connector ring 108 is connected to a drive ring 110 which rides on a fixed track 112 carried by a bearing assembly 114.

Drive ring 110 is connected to a drive chain 115 by chain connectors 117 (see FIG. 15). Chain 115 is trained through a gear box 120 (FIG. 15) connected to floor 24 and powered by docking drive motor 118. Operation of the chain 115 moves the drive ring 110 and causes the outer ring 94 to move relative to the inner ring 93. Motor 118 can drive chain 115 in clockwise or counterclockwise direction.

Proximity sensors 121 are mounted about the circumference of the docking assembly 33 to sense the proximity of a vessel 35.

In the use of the waste transfer system, a containment cell 22 holds contaminated material in need of disposition without contaminating the exterior environment. This may include for example instrumentation and products exposed to a radioactive environment. A storage vessel is prepared in combination with a 55-gallon storage drum 36. Other suitable containment and storage vessels could be used.

The containment cell has a waste transfer port 28 defined in a floor 24. Floor 24 is located over a collection room 25. The port door 40 normally closes the transfer port 28 and is tightly seated therein to prevent contaminate leakage from the containment cell. The closure face of the port door faces the collection room. The drum 36 with the empty and closed vessel 35 is transported by a bogie 38 to a location beneath the transfer port 28. Drum lift 39 elevates the drum 36 and vessel 35 toward the docking station 33.

As the vessel 35 approaches the docking station the alignment lugs 71 are intercepted by the ramp surfaces between adjacent crown peaks on the docking ring assembly 92 as shown in FIG. 13. The drum 36 is permitted to rotate on the bogie 38. The lugs are guided to a docked position into slots 97, 99. In the docked position the ears 78 on the closure face of the cover 40 have passed through notches 84 on the outer face of the vessel cover 73 in a pre-interlock position as shown in FIG. 7.

The proximity sensors 121 have determined that the vessel is in position beneath the transfer port 28. The chain drive motor 118 is operated to drive the chain 115 to rotate the outer docking ring 94. Upon rotation of the outer docking ring 94 the inner locking ring remains stationary and the alignment lugs 71 are moved into the horizontal slots 101 in the crown peaks 96 of the inner docking ring. This movement rotates the vessel 35 and the cover 73. The cover 73 rotates to a position where the ears 78 of port door 40 are in interlocked engagement with the rim 81 of cover 73. The same rotation is effective to disengage the cover from the vessel 35. In this position the ears 88 on the vessel are rotated to a position aligned with the notches 86 on the cover 73 whereby the cover can be moved away from the vessel 35.

Next the port door motor 53 is operated to move the port door away from the transfer port 28 to the port-door open position shown in FIG. 3. In this position the outside face of the vessel cover 73 is tightly sealed against the closure face of the port door by the seal port door seal 79 so that neither is contaminated by the environment inside cell 22.

With the port door 40 open the funnel 59 can be lowered into place in the transfer port 28. The funnel is manipulated through the use of remote manipulators (not shown) available in the containment cell to manipulate various items therein. The same manipulators are used to transfer material from the containment cell to the vessel.

Once the material transfer is complete the funnel is removed and the port door is closed. Upon closure of the port door the vessel cover is repositioned on the vessel while still interlocked with the port door. The chain drive motor is operated to move the chain 115 in a direction opposite to that of the opening procedure. The alignment lugs 71 are moved out of engagement with the horizontal slots 101 as the port door and the vessel cover disengage. The same rotational movement causes the vessel cover to interlock with the vessel 35. Once the cover is locked on the vessel the vessel is removed.

During the waste transfer procedure a spread of contamination from the contamination cell is minimized. The port door closure surface and the outer face of the vessel cover are sealed from exposure to the cell environment when in the cell. During the transfer procedure the vessel is sealed to the cell floor whereby the interior of the drum is not exposed to the outside environment. The simultaneous locking and unlocking between the port door and the liner cover, and the liner cover and the vessel, minimizes the opportunity for leakage.

The embodiments of the invention in which an exclusive property or privilege is claimed are defined as follows:

1. A material transfer system comprising:
    a cell floor for separating a containment environment from an exterior environment and having a first side for the containment environment side and a second side for the exterior environment side, said cell floor having a waste transfer port;
    a port door located on the first side of the cell floor and movable between an open position clear of the port and a closed position in sealing relationship to the port, said port door having a closure face with a first connector set;
    a storage vessel located on the second side of the cell floor and having an open end for receipt of waste material transferred through the port;
    a storage vessel cover connectable to the open end of the storage vessel to close and seal the storage vessel;
    said storage vessel cover having a base with an outside face that faces outward of the storage vessel when the cover is connected to the storage vessel, and an inside face;
    the outside face of the cover having a second connector set that can interlock with the first connector set;
    a third connector set on the inside face of the cover;
    a fourth connector set on the storage vessel that can interlock with the third connector set;
    a docking station connected to the second side of the cell floor in surrounding relationship to the port for docking the storage vessel, wherein the docking station includes a docking ring assembly comprising
        a cylindrical segment with an inverted crown shape having crown peaks and valleys, and
        vertical slots defined in the valleys between the crown peaks; wherein:
    said first and second connector sets of the variety that engage and disengage upon rotation of the cover relative to the closure face of the port door;
    said third and fourth connector sets of the variety that engage and disengage upon rotation of the cover relative to the storage vessel;
    said first and second connector sets and said third and forth connector sets relatively arranged so that with the port door closed, rotation of the storage vessel in a first direction interlocks the first and second connector sets and releases the third and fourth connectors sets so that the port door can be opened with the vessel cover to open the storage vessel, and rotation of the storage vessel in a second direction with the port door closed releases the first and second connector sets and interlocks the third and fourth connector sets so that the storage vessel is closed and can be moved away from the port.

2. The transfer system of claim 1 including: a hinge bar connected at one end to the port door and connected at the other end to the cell floor for pivotal movement of the port door between the open and closed positions; and a drive motor connected to the hinge bar.

3. The transfer system of claim 2 wherein: the port door has a truncated conical body ending in a reduced diameter neck; the first connector set includes a perimeter of fastening ears spaced about the neck and extending radially outward; a circumferential rim extending perpendicularly from the base of the storage vessel cover and a lip attached to the end of the rim parallel to and spaced from the base defining a channel; said second connector set including a perimeter of notches on the lip corresponding to the ears on the closure face of the port door.

4. The transfer system of claim 3 wherein: the third connector set includes a perimeter of spaced apart notches and the fourth connector set includes perimeter of ears corresponding to the notches on the third connector set.

5. The transfer system of claim 1 including: a funnel assembly having a funnel movable into and out of position with respect to the port.

6. The transfer system of claim 1 wherein the docking ring assembly includes an inside locking ring and a concentric symmetrical outside docking ring;
    each ring comprised as a cylindrical band with an inverted crown shape.

7. The transfer system of claim 6 wherein said inside ring is held stationary with respect to the cell floor and said outside ring is rotatable with respect to the inside ring.

8. The transfer system of claim 7 wherein: the outside ring is mounted on a circular track.

9. The transfer system of claim 8 including: a docking collar on the storage vessel that has a plurality of radially extending alignment lugs spaced about the periphery of the storage vessel, said lugs corresponding to the valleys on the docking rings so as to be intercepted by the docking rings when the storage vessel is brought into docking alignment with the docking station.

10. The transfer system of claim 9 including: a motor to rotate the outside ring relative to the inside ring.

11. The transfer system of claim 9 wherein: each crown peak on the inside ring has a horizontal slot intersecting the vertical slot and positioned so that when an alignment lug is positioned in a vertical slot rotation of the outside ring relative to the inside ring will move the alignment lug into the horizontal slot to dock the storage vessel to the cell floor.

12. The transfer system of claim 11 including: a cell flange installed in the port; said inner ring connected to the cell flange.

13. The transfer system of claim 11 including: a 55-gallon drum; said storage vessel located in the 55-gallon drum.

14. A waste storage container for use with a hazardous waste material transfer system of the type including a cell floor having a waste transfer port, a port door located on a first side of the cell floor and movable between an open position clear of the port and a closed position in sealing relationship to the port, said port door having a closure face with a first connector set of the variety that with a corresponding second connector set will engage and disengage upon relative rotation, said waste container comprising:
    a storage vessel for location on a second side of the cell floor and having an open end for receipt of waste material transferred through the port when the port door is open;
    a storage vessel cover connectable to the open end of the storage vessel to close and seal the storage vessel; said storage vessel cover having a base with an outside face that faces outward of the storage vessel when the cover is connected to the storage vessel, and an inside face; the outside face of the cover having a second connector set that can interlock with a first connector set on the port door when the port door is closed;

a third connector set on the inside face of the cover;

a fourth connector set on the storage vessel that can interlock with the third connector set;

a docking station connected to the second side of the cell floor in surrounding relationship to the port for docking the storage vessel, wherein the docking station includes a docking ring assembly comprising:

a cylindrical segment with an inverted crown shape having crown peaks and valleys, and vertical slots defined in the valleys between the crown peaks;

second connector set corresponding to the first connector set of the variety that will engage and disengage upon rotation of the cover relative to the closure face of the port door;

said third and fourth connector sets of the variety that will engage and disengage upon rotation of the cover relative to the storage vessel;

second connector set relatively arranged with the first connector set and said third and fourth connector sets relatively arranged so that with the port door closed, rotation of the storage vessel in a first direction interlocks the first and second connector sets and releases the third and fourth connectors sets so that the port door can be opened with the vessel cover connected to it to open the storage vessel, and rotation of the storage vessel in a second direction with the port door closed releases the first and second connector sets and interlocks the third and fourth connector sets so that the storage vessel is closed and can be moved away from the port.

15. The waste storage container of claim 14 wherein: the second connector set is a bayonet connector set.

16. The waste storage container of claim 14 wherein: the third and fourth connector sets are bayonet connector sets.

17. The waste storage container of claim 14 wherein the port door is of the type having a truncated conical body ending in a reduced diameter neck and the first connector set includes a perimeter of fastening ears spaced about the neck and extending radially outward, including; a circumferential rim extending perpendicularly from the base of the storage vessel cover and a lip attached to the end of the rim parallel to and spaced from the base defining a channel; said second connector set including a perimeter of notches on the lip corresponding to the ears on the closure face of the port door.

18. The waste storage container of claim 14 wherein: the third connector set includes a perimeter of spaced apart notches and the fourth connector set includes perimeter of ears corresponding to the notches on the third connector set.

19. The waste storage container of claim 14 wherein: said storage vessel has exterior dimensions to fit in an unlined standard 55 gallon drum.

20. The waste storage container of claim 19 including: a standard 55-gallon drum; said storage vessel located in the 55-gallon drum.

21. The waste storage container of claim 14 wherein: said storage vessel has exterior dimensions to fit in a lined standard 55-gallon drum.

22. The waste storage container of claim 14 including: a lined standard 55-gallon drum; said storage vessel located in the 55-gallon drum.

23. The waste storage container of claim 14 wherein said waste material transfer system is of the type having a docking station and including: a plurality of radially extending alignment lugs spaced about the perimeter of the storage vessel for docking the storage vessel to the docking station.

24. A material transfer system comprising:

a cell floor for separating a containment environment from an exterior environment and having a first side for the containment environment side and a second side for the exterior environment side, said cell floor having a waste transfer port;

a port door located on the first side of the cell floor and movable between an open position clear of the port and a closed position in sealing relationship to the port, said port door having a closure face with a first connector set;

a storage vessel located on the second side of the cell floor and having an open end for receipt of waste material transferred through the port;

a storage vessel cover connectable to the open end of the storage vessel to close and seal the storage vessel;

said storage vessel cover having a base with an outside face that faces outward of the storage vessel when the cover is connected to the storage vessel, and an inside face;

the outside face of the cover having a second connector set that can interlock with the first connector set;

a third connector set on the inside face of the cover;

a fourth connector set on the storage vessel that can interlock with the third connector set;

said first and second connector sets of the variety that engage and disengage upon rotation of the cover relative to the closure face of the port door;

said third and fourth connector sets of the variety that engage and disengage upon rotation of the cover relative to the storage vessel;

a gear box extending through the cell floor;

a drive shaft installed in the gear box and structurally communicating with the port door;

an electric motor that drives the drive shaft and operatively moves the port door between the open and closed positions;

said first and second connector sets and said third and forth connector sets relatively arranged so that with the port door closed, rotation of the storage vessel in a first direction interlocks the first and second connector sets and releases the third and fourth connectors sets so that the port door can be opened with the vessel cover to open the storage vessel, and rotation of the storage vessel in a second direction with the port door closed releases the first and second connector sets and interlocks the third and fourth connector sets so that the storage vessel is closed and can be moved away from the port.

25. The material transfer system of claim 24 further comprising:

a docking station connected to the second side of the cell floor in surrounding relationship to the port for docking the storage vessel, wherein the docking station includes a docking ring assembly comprising:

a cylindrical segment with an inverted crown shape having crown peaks and valleys, and vertical slots defined in the valleys between the crown peaks.

26. The transfer system of claim 24 wherein the docking ring assembly includes an inside locking ring and a concentric symmetrical outside docking rings; each ring comprised as a cylindrical band with an inverted crown shape.

27. The transfer system of claim 26 wherein-said inside ring is held stationary with respect to the cell floor and said outside ring is rotatable with respect to the inside ring.

28. The transfer system of claim 27 including: a docking collar on the storage vessel that has a plurality of radially extending alignment lugs spaced about the periphery of the storage vessel, said lugs corresponding to the valleys on the docking rings so as to be intercepted by the docking rings when the storage vessel is brought into docking alignment with the docking station.

29. The transfer system of claim 28 including: a motor to rotate the outside ring relative to the inside ring.

* * * * *